(12) United States Patent
Roshen

(10) Patent No.: US 6,660,412 B2
(45) Date of Patent: Dec. 9, 2003

(54) LOW LOSS, HIGH FREQUENCY COMPOSITE MAGNETIC MATERIAL AND METHODS OF MAKING THE SAME

(76) Inventor: Waseem A. Roshen, 4680 Marblehead Ct., Columbus, OH (US) 43220

( * ) Notice: Subject to any disclaimer, the term of this patent is extended or adjusted under 35 U.S.C. 154(b) by 249 days.

(21) Appl. No.: 09/809,546

(22) Filed: Mar. 15, 2001

(65) Prior Publication Data

US 2002/0132136 A1 Sep. 19, 2002

(51) Int. Cl.$^7$ ............................. B32F 7/00; B32B 9/00
(52) U.S. Cl. ...................... 428/692; 428/551; 428/611; 174/35 MS
(58) Field of Search .................... 428/681, 611, 428/692, 693, 213, 694 R, 694 MM, 694 IS, 694 TM, 900; 310/15.21, 154.07, 154.41, 156.11, 156.21, 156.25, 156.42; 336/84 R, 84 C, 84 M, 192, 200, 206, 207, 217; 360/126, 327.2, 327.21, 327.32

(56) References Cited

U.S. PATENT DOCUMENTS

| | | | |
|---|---|---|---|
| 3,451,130 A | * 6/1969 | Ellis | 336/217 |
| 3,726,005 A | * 4/1973 | Prostor | 336/207 |
| 4,748,430 A | * 5/1988 | Guais | 336/84 C |
| 5,239,435 A | * 8/1993 | Jeffers et al. | 360/126 |
| 5,331,728 A | * 7/1994 | Argyle et al. | 360/126 |
| 5,483,115 A | * 1/1996 | Haisma et al. | 310/156.21 |
| 5,554,902 A | * 9/1996 | Kessens et al. | 310/156.21 |
| 5,684,352 A | * 11/1997 | Mita et al. | 310/156.56 |
| 5,696,477 A | * 12/1997 | Yamamori et al. | 336/192 |
| 5,726,838 A | * 3/1998 | Soeya et al. | 360/327.32 |
| 5,990,417 A | * 11/1999 | Senda et al. | 174/35 MS |
| 6,233,125 B1 | * 5/2001 | Knapp et al. | 360/327.2 |
| 6,391,431 B1 | * 5/2002 | Sano et al. | 428/692 |
| 6,404,317 B1 | * 6/2002 | Mizoguchi et al. | 336/200 |
| 6,509,667 B1 | * 1/2003 | El-Antably et al. | 310/156.21 |

OTHER PUBLICATIONS

Powerconversion & Intelligent Motion Jul. 1988 vol.:14 No. 7 pp. 19–25.

* cited by examiner

Primary Examiner—Stevan A. Resan
Assistant Examiner—Louis Falasco
(74) Attorney, Agent, or Firm—David A. Greenlee

(57) ABSTRACT

A high frequency, low loss, power, composite magnetic material includes alternating magnetic plates of low hysteresis loss material and electrically insulating films. The multi-layer structure allows for independently and simultaneously controlling and reducing hysteresis loss and eddy current loss, and maintaining a high resistivity, while operating at high frequencies and at high flux density levels, resulting in extremely low net loss density for the composite material. Methods of making this material include co-firing of the magnetic plates and thin insulating films, making the magnetic plates (of low hysteresis material, such as a ferrite) and insulating films separately, and using heat and/or pressure and/or adhesive or making a stack of magnetic plates with spacers in between them and dipping in a molten or liquid insulating material.

18 Claims, 6 Drawing Sheets

LOW LOSS, HIGH FREQUENCY COMPOSITE MAGNETIC MATERIAL AND METHODS OF MAKING THE SAME

FIELD OF THE INVENTION

The present invention relates generally to magnetic materials, and more particularly, to high frequency magnetic materials used in power electronics applications.

BACKGROUND OF THE INVENTION

High operating frequencies are desirable for power conditioning equipment (such as power supplies, power amplifies and lamp ballasts) in order to reduce the size of magnetic components. Unfortunately, however, it has been heretofore impossible to substantially reduce the size of magnetic components because the operating flux density has to be reduced too much to enable proper operation and still have acceptable losses at high frequencies. In particular, while at low frequencies (e.g. 100 kHz), the operating flux density can be in the 1000–3000 Gauss range using semi-conducting ferromagnetic materials (typically ferrites), the operating flux density to achieve acceptable losses in the megahertz range is from 20 to 300 Gauss, which is too low to give any significant size advantage.

In addition, there is considerable drive to push the operating frequencies of power conditioning equipment to frequencies even higher than 5.0 MHz. However, the losses of the current high frequency materials rise very sharply with increasing frequency in 1 to 10 MHz range, making these material unsuitable for use at such high frequencies. In particular, the losses of these high frequency materials increase as the $4^{th}$ power of the frequency above one megahertz.

A variety of publications describe the state of the art in this field. These publications include a book by A. Goldman: *Modern Ferrite Technology* (Van Nostrand Reinhold, N. Y., 1990, p. 185–211). Detailed properties of soft ferrites are also described in a book by E. C. Snelling: *Soft Ferries: Properties and Applications*, $2^{nd}$ edition (Butterworths, London, 1988) and $1^{st}$ edition (Iliffe, London, 1969, chapters 2, 3).

The following are the four major reasons for the two problems described hereinabove and for making the current state-of-the-art materials unsuitable for use in high frequency and high flux density operation.

First, the people involved in the development of high frequency magnetic materials for use in power electronics have only tried to reduce eddy current losses. Unfortunately, the methods used to control eddy current losses (these methods include reducing the grain size to increase the grain boundary surface and increased addition of materials like $SiO_2$ and CaO) have resulted in increased hysteresis loss. This increased hysteresis loss produces a very high dependence of the net high frequency losses on the flux density because hysteresis loss varies as the cube of the flux density. Thus, making these materials unsuitable for use at high flux densities and high frequencies.

Yet, another problem with the current approach for making low loss high frequency magnetic material is that the eddy current losses are not completely eliminated and they still make substantial contribution to the total loss in the 100 kHz to 1.0 MHz. This is evident from the measured net losses, which increase as the square of the frequency (hysteresis loss increase, generally, linearly with frequency).

In addition, the eddy loss dominate the net losses at frequencies higher than 1 MHz. The main reason for this failure to control eddy current losses are very thin, non-uniform grain boundary layer, which is supposed to produce high resistivity. However, at high frequencies this layer begins to yield due to capacitive electrical shorting of boundary layer. The thinner that layer the more noticeable is this effect. The measured resistivity of the current state-of-the-art materials show a continuous decrease in the value of the resistivity in 100 kHz to 10 MHz range. All the previous attempts to reduce this effect have failed.

Yet, another problem with the current high frequency material is that very large electric fields are produced at the grain boundaries, which leads to a dielectric break down of the material at the grain boundaries and to a resistivity, which is a decreasing function of the flux density. This is because the thickness of the grain boundary layer is extremely small (for typical high frequency ferrite the thickness is in $10^{-3}$ to $10^{-2}$ micron range) and the fact that the resistivity of the crystallites is negligible compared to that of grain boundary layer. In particular, even for a very small core, the induced electric field at 1.0 MHz and at 500 Gauss exceeds 10 kV/cm. These values of electric field far exceed the dielectric strength (typically around 2 kV/cm) of the material at the grain boundary. This leads to resistivity, which decreases rapidly with increasing frequency and flux density. The end result is the increased dependence of high frequency loss on flux density, which further limits the flux density at which these materials can be operated.

The fourth major problem relate to the use of these materials for very high frequency applications and for very high power. This is because of large permeability and dielectric constant, which give a small electromagnetic wavelength at high frequencies. Due to this very small wavelength, dimensional resonance can be set up even in small cores and leads to additional losses. In particular, for typical high frequency ferrites, the wavelength is about 1 mm at 10 MHz and thus making these materials unsuitable even for very small cores. As power level of application such as power supply increases, the size of core increases making the problem worst and restricting the use of these materials to very low powers at such high frequencies.

Accordingly, it is desirable to provide high power magnetic material, which can be operated at high flux levels (e.g. greater than 500 Gauss) while maintaining high frequency operation (e.g. 1 to 10 MHz). Furthermore, such material should have a resistivity, which is independent of the frequency and flux density and should allow for independent control and reduction of hysteresis loss and eddy current loss. In addition, such magnetic material should have a structure, which allows for effective size of the core to be substantially smaller than the electromagnetic wavelength at high frequencies.

SUMMARY OF THE INVENTION

A composite, high frequency, low loss material consists of alternate magnetic plates and insulating films. The magnetic plates are designed to have very lax requirements on the resistivity of the magnetic material comprising the magnetic plates, so that the hysteresis loss can be reduced easily. The eddy current loss is controlled by the thin insulating films and by varying the thickness of the magnetic plates. The insulating films are designed to have high integrity (free of pin holes and other defects), high dielectric strength, high resistivity and, preferably, low dielectric constant. The insulating films perform the same functions as that of the grain-boundary layer in current state-of-the-art magnetic material (ferrites) but are able to maintain their functionality up to much high frequency and much higher flux densities resulting in very high resistivity of the composite material. The resistivity of the composite material is independent of the frequency and flux density to high values of frequencies (~100 MHz). The magnetic plates and the insulating films can be co-fired. One method of co-firing utilizes green tape technology.

Alternatively, the magnetic plates and the insulating films can be manufactured separately and then the composite ferrite be fabricated by using adhesive and/or heat and pressure treatment. Yet another method of fabricating these composite ferrites is by manufacturing the low hysteresis loss ferrite plates, depositing thin or thick films of the insulating material on both sides of the ferrite plates, stacking the ferrite plates and then applying heat and pressure to melt or soften the insulating films and to attach the ferrite plates to each other. A further method of fabricating these composite ferrite plates is by making a stack of low hysteresis loss ferrite plates with spacers, and dipping the stack in a liquid insulating material or pouring the insulating material over the stack.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
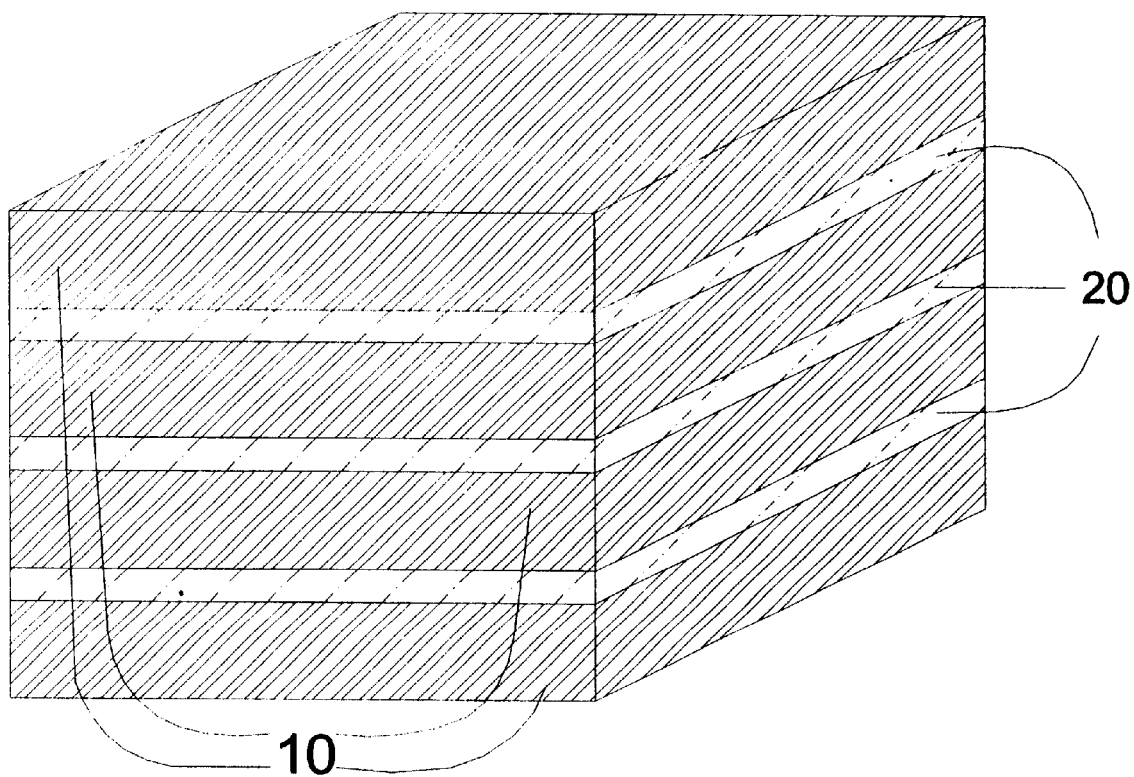
FIG. 1 illustrates the basic structure of the new high frequency, low loss magnetic material comprising alternate layers of low Hysteresis loss magnetic material and thin films of electrically insulating material.

FIG. 1 illustrates a simple embodiment of the high frequency, low loss composite magnetic material comprising alternate layers of magnetic plates 10 and insulating films 20. Magnetic plates 20 comprise low hysteresis loss magnetic material, such as MnZn ferrites with hysteresis loss densities of 0.01 to 0.10 joules/cycle/cc. The thickness of magnetic plates 10 would be chosen such that the eddy currents flowing within a given magnetic plate 10 are not significant. For operation in the frequency range of 1–10 MHz, a typical thickness of magnetic plates 10 is on the order of 0.010–0.100 inch. Insulating films 20 comprise a material such as Kapton polyamide film (manufactured by E. I. duPont de Nemours and Company), silicone dioxide ($SiO_2$), aluminum oxide, calcium oxide, magnesium oxide, aluminum nitride or beryllium oxide. A typical thickness for insulating films 20 is on the order of 10 to 30 microns. Insulating films 20 have high resistivity, high dielectric strength and, preferably, low dielectric constant. Insulating films 20 perform the same function in controlling the bulk eddy currents as that of insulating grain boundary layer in a typical state-of-the-art, high frequency magnetic materials, such as a ferrite, but are able to maintain their functionality to much higher frequencies. Typical range of operation of the present invention is 1–10 MHz, although, advantageously, these materials can also be used in lower frequency ranges (e.g. 100 kHz to 1 MHz) to reduce the size of magnetic components because they can be driven at much higher flux levels.

Figure 2:
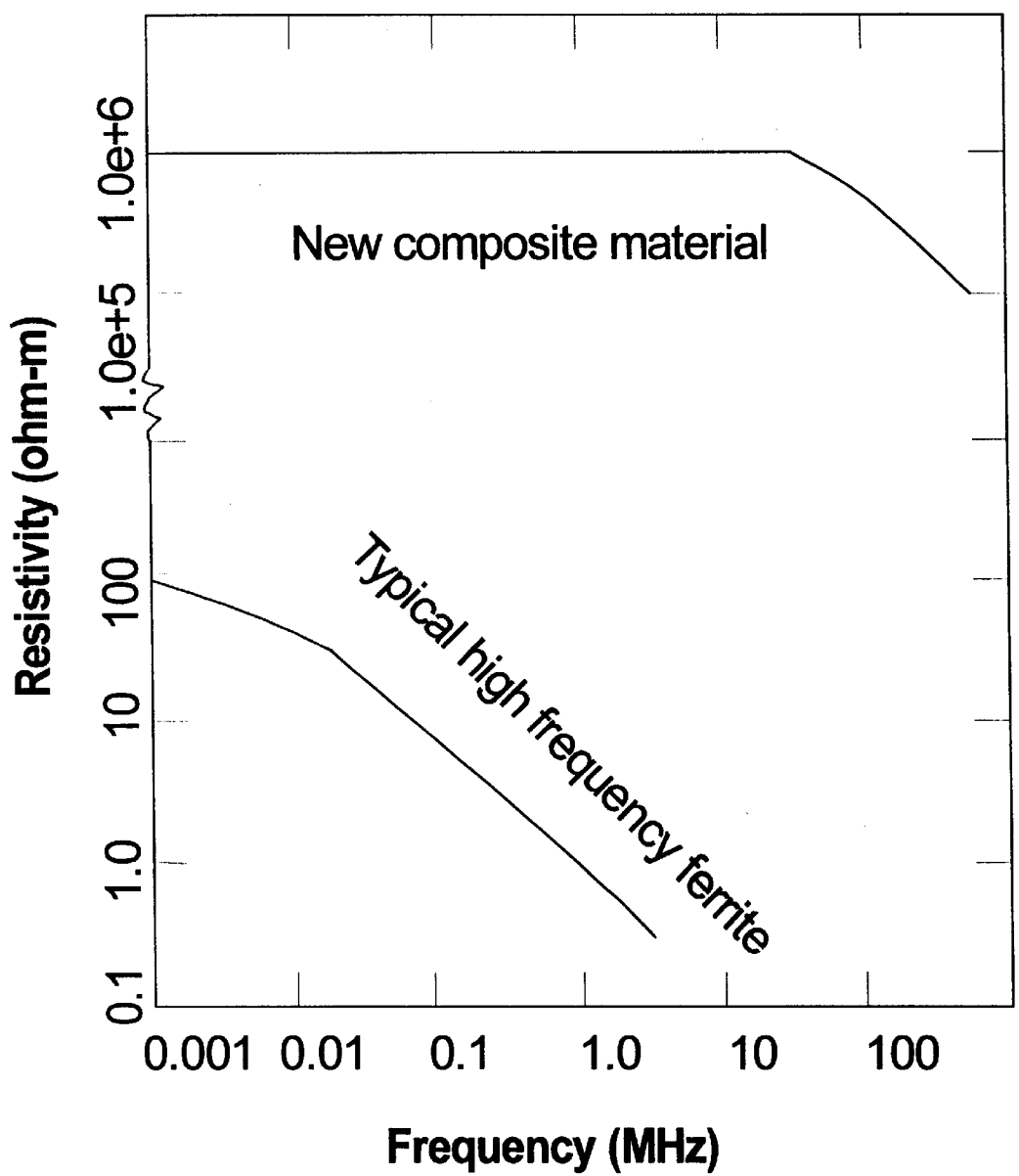
FIG. 2 graphically illustrates the independence of the resistivity of the new high frequency, low loss magnetic material up to very high frequencies. Also shown is the resistivity of conventional high frequency magnetic materials as function of frequency.

Advantageously, the relative thickness of insulating films 20 relative to magnetic plates 10 is very large, when compared to the thickness of magnetic grains of the grain boundary layer in a typical conventional high frequency magnetic material. A typical relative thickness of insulating films 20 of the present invention is of the order of 0.1, while the relative thickness of a conventional insulating grain boundary layer is in the range $10^{-4}$–$10^{-3}$. This very large relative thickness of insulating films 20 results in a very large reduction in the overall capacitance and therefore, the material is able to retain high resistivity up to very high frequencies. FIG. 2 is a graphical comparison of the resistivity of the material made according to the present invention with that of a typical state-of-the-art high frequency material. As shown in the graph of FIG. 2, a typical material made according to present invention is able to maintain high resistivity up to 100 MHz. In contrast, the resistivity of the current state-of-the-art high frequency materials (such as a high frequency ferrite) begins to drop at 10–100 kHz range and continues to decrease with increasing frequencies in 100 kHz to 10 MHz range. The high resistivity of the new materials eliminates bulk eddy current loss even at very high frequencies, thus allowing the new material to be used at high frequencies.

Figure 4:
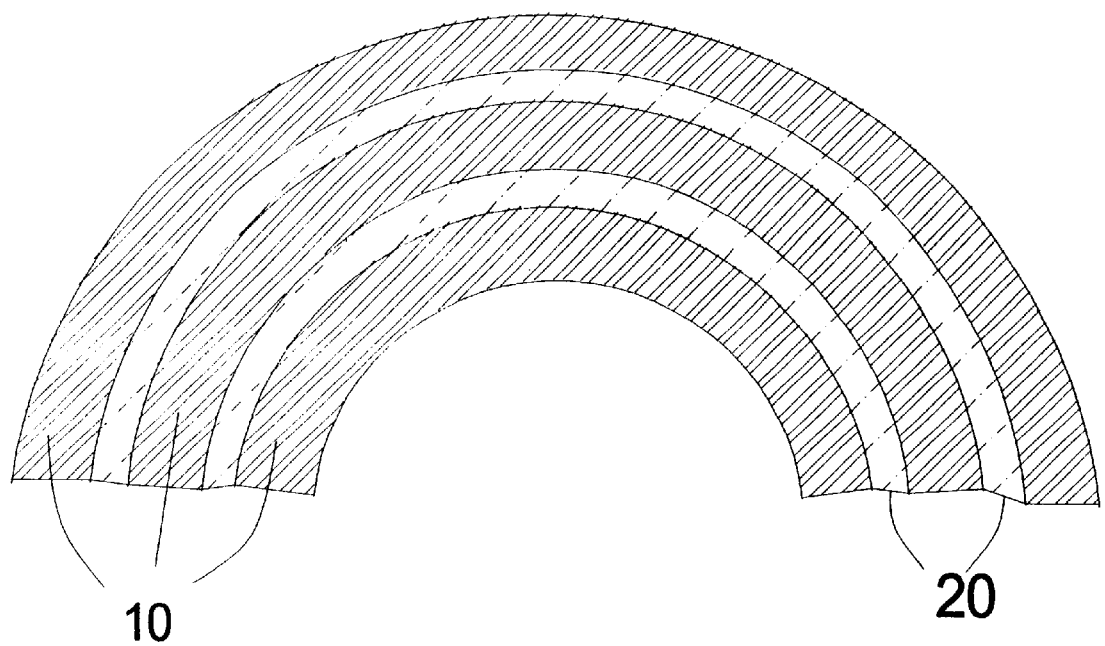
FIG. 4 illustrates yet another embodiment of the current invention comprising curved shaped low Hysteresis loss magnetic material and insulating films.

Advantageously, the problem of dielectric break down does not occur in the material made according to the present invention. This is because the thickness (~10 microns) of the insulating films 20 is many orders of magnitude larger than the thickness of the grain boundary layer in a typical high frequency magnetic material ($10^{-3}$–$10^{-2}$ microns) for a ratio of ~1000:1. This relatively large thickness means that the electric fields induced by the rapidly changing magnetic fields would be orders of magnitude smaller than those seen at the grain boundary in a conventional high frequency magnetic material. Thus, the problem of dielectric breakdown does not occur in the materials made according to the present invention and the materials are able to maintain high resistivity up to very high flux levels and high frequencies. This allows the new materials to be operated at high flux levels and at high frequencies. Additionally, modern insulating materials, which have extremely high resistivities, can be used, resulting in much higher resistivities of the composite high frequency material of the present invention. This is shown in FIG. 4, which shows the resistivity of the new composite material to be orders of magnitude higher than those of conventional high frequency magnetic materials.

The choice of insulating materials used at the grain boundary of the conventional high frequency magnetic material is very limited. Typically only $SiO_2$ or CaO can be used in conventional material. These insulating materials have relatively low dielectric strength (~2 kV/cm). Materials made according to present invention enable the use of modern insulating materials for making insulating films 20. Modern materials, such as the polyamide Kapton films made by E. I. duPont de Nemours and Company, have extremely high dielectric strength (~100 kV/cm). The use of such materials further eliminates the problem of dielectric breakdown at high flux levels and, advantageously, allows the material to be driven to high flux levels at high frequencies.

Advantageously, the structure of the composite, high frequency material of the present invention enables independent and simultaneous control and reduction of the high frequency eddy current loss and the hysteresis loss. It is very difficult to obtain such control in other high frequency materials. In particular, the resistivity of the magnetic material of magnetic plates 10 can be chosen to be relatively low. A typical high frequency resistivity of the magnetic material of the magnetic plates 10 is on the order of 0.01 to 0.1 ohm-m. This is because the eddy current loss in the present invention is controlled independently by the insulating films 20 and by the thickness of the magnetic plates 10 and a high resistivity of the magnetic material of plates 10 is not needed. The very lax requirements on the resistivity of the magnetic materials of plates 10 allows the grains of the magnetic material to be made relatively large, thereby reducing the surface area of the grain boundaries and making it possible to achieve very low hysteresis losses. Additionally, the lax requirements on the resistivity of the material of magnetic plates 10 makes it possible to use a larger ratio of $Fe^{+3}$ to $Fe^{+2}$, which leads to further reduction in the hysteresis loss.

Advantageously, the thickness of magnetic plates 10 is typically an order of magnitude smaller than the size of a typical high frequency core of a magnetic component and, therefore, the problem of dimensional resonance is avoided up to much higher frequencies. In particular, the magnetic components made with the composite high frequency, low loss material of the present invention is able to function properly in the 1–10 MHz range. This also allows the material made according to present invention to be used in very high power cores.

Figure 3:
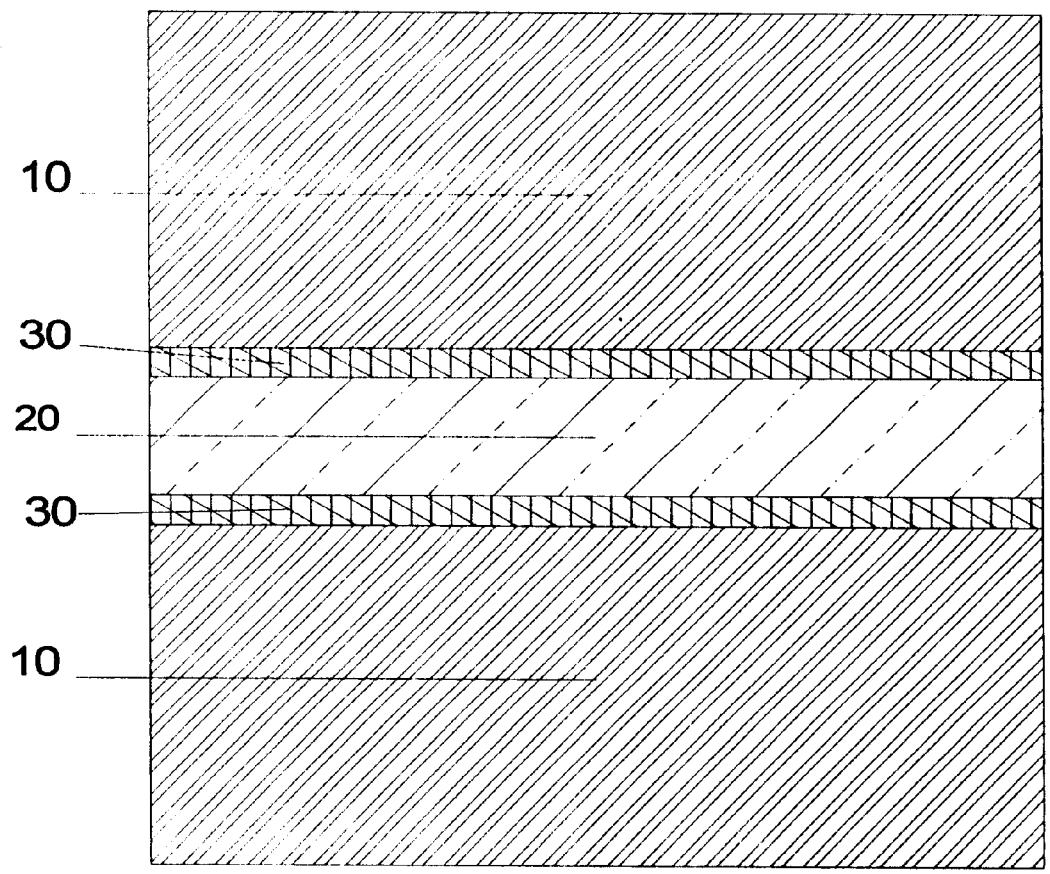
FIG. 3 illustrates another embodiment of the new high frequency, low loss magnetic material comprising alternate layers of low hysteresis magnetic material, thin insulating films and adhesive layers. Shown is a cross-sectional view.

FIG. 3 illustrates another embodiment of the present invention, comprising alternate layers of low hysteresis loss magnetic plates 10, thin insulating films 20, and very thin adhesive films 30, shown in cross-section. Such an embodiment is suitable, for organic insulating films 20, such as Kapton polyamide manufactured by E. I. duPont de Nemours and Company. Suitable materials for the adhesive films comprise various hyprocarbon resins such as TEFLON, which s also manufactured by duPont.

FIG. 4 illustrates another embodiment of the present invention, comprising alternate layers of curved magnetic plates 10 and curved insulating films 20. This embodiment is suitable for the manufacture of rounded core pieces, such as the center post and the outer walls of a pot core, RM core or PQ core.

Figure 5:
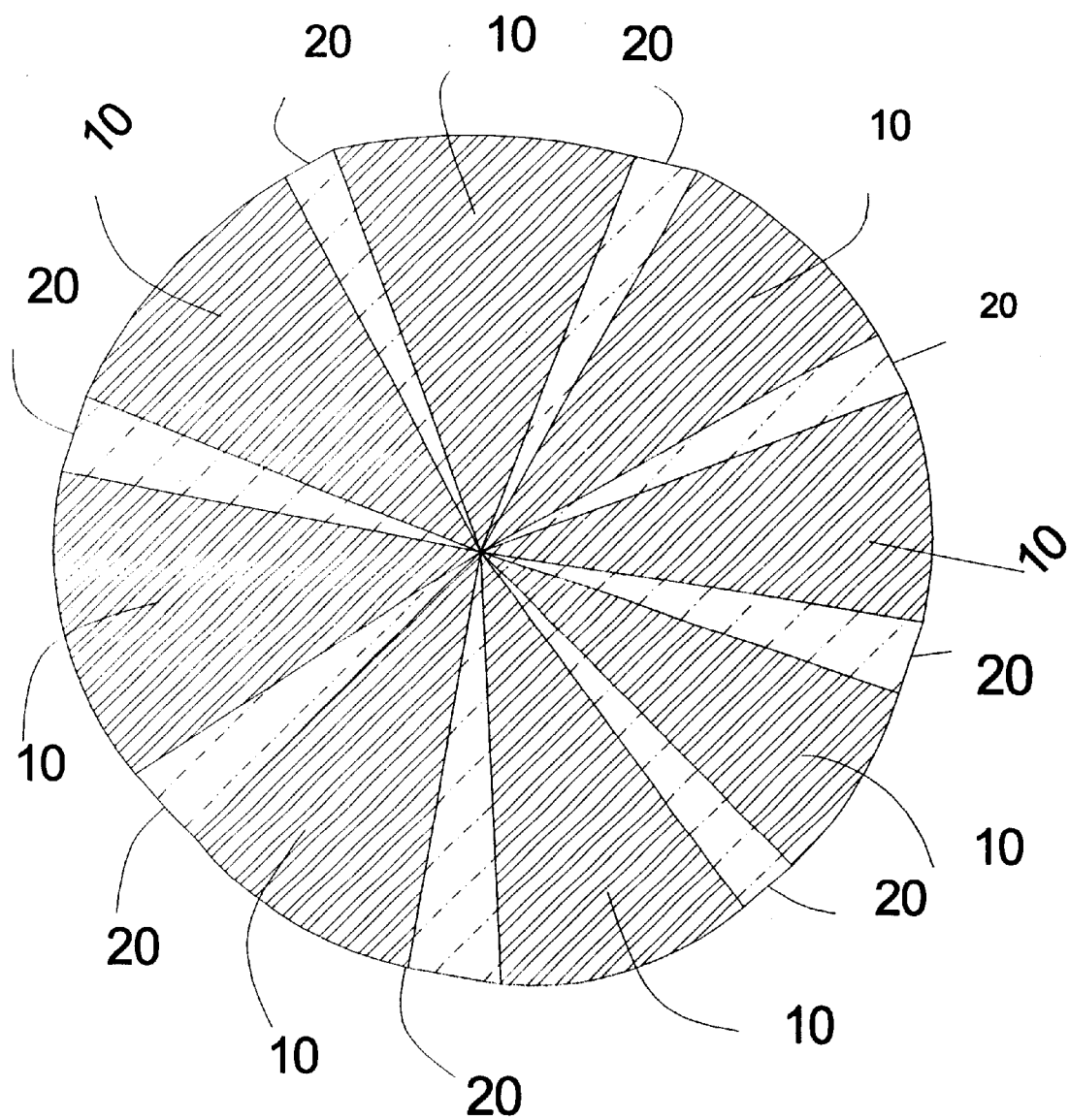
FIG. 5 illustrates another embodiment of the present invention comprising pie-piece shaped cross-section of low Hysteresis loss magnetic material plates and insulating films.

FIG. 5 shows yet another embodiment of the present invention, comprising alternate magnetic plates 10, each having a substantially pie-piece shaped cross-section, and insulating films 20 with triangular cross-section. Such an embodiment is suitable for making the center post of a pot core or a RM core or PQ core.

There are many methods of making the composite, high frequency material of the present invention. One method involves separately preparing the magnetic plates 10 by either pressing a low hysteresis loss material in plate shapes prior to firing, or by machining the magnetic plates 10 from a pre-fired block of low hysteresis loss magnetic material. After making the magnetic plates, an adhesive 30 is applied to the both sides of the insulating films 20 or the magnetic plates 10, or to both, and a stack is built of alternating magnetic plates 10 and insulating films 20. Finally mechanical pressure or heat or both are applied to the stack to bond the magnetic plates 10 and the insulating plates 20. Such a method is suitable for use when the insulating film 10 is made of a polymer or polyamide such as Kapton films made by E. I. duPont de Nemours and Company.

A further method of making the composite, high frequency magnetic material of the present invention comprises separately making magnetic plates 10 by either (a) pressing a low Hysteresis loss material in plate shapes prior to firing and then firing, or (b) by machining the magnetic plates 20 from a block of pre-fired low Hysteresis loss material, disposing a small amount of an insulating material on at least one side of the magnetic plates 10, stacking the plates on top of each other, applying heat and pressure to melt or soften the insulating material, and cooling the stack so that thin insulating films 20 are formed, and provide bonding, between adjacent magnetic plates 10. The insulating material can be disposed in powder form or through thick or thin film processes. This method is suitable when the insulating material is a glass (silicon dioxide) or a low melting temperature glass.

Yet another method of making the composite, high frequency magnetic material of the present invention comprise co-firing magnetic plates 10 and the insulating films 20. This method is suitable when the insulating material comprises a ceramic such as aluminum oxide, aluminum nitride or beryllium oxide. Such materials have firing conditions similar to those of high frequency magnetic materials and can be fired along with the high frequency magnetic plates 10. This method comprises green tape technology. In this method, green tapes of low hysteresis loss magnetic material and of an insulating material are prepared separately. Typical thickness of these green tapes is in 0.001" to 0.005" range. The tapes are cut into suitable sizes and small stacks are made of a small number of green tapes of the low hysteresis loss magnetic material. A big stack is made by alternating small stacks of magnetic material green tapes with the insulating green tapes. The big stack is laminated under mechanical pressure. The laminated big stack is heated to 400–600° C. to burn off the binder in the tapes and, finally, the big stack is sintered at 1000–1400° C. and cooled. The sintering and cooling, in some cases, is done under controlled atmosphere in which the amount of oxygen and other gases is prescribed according to a predetermined formula.

Figure 6:
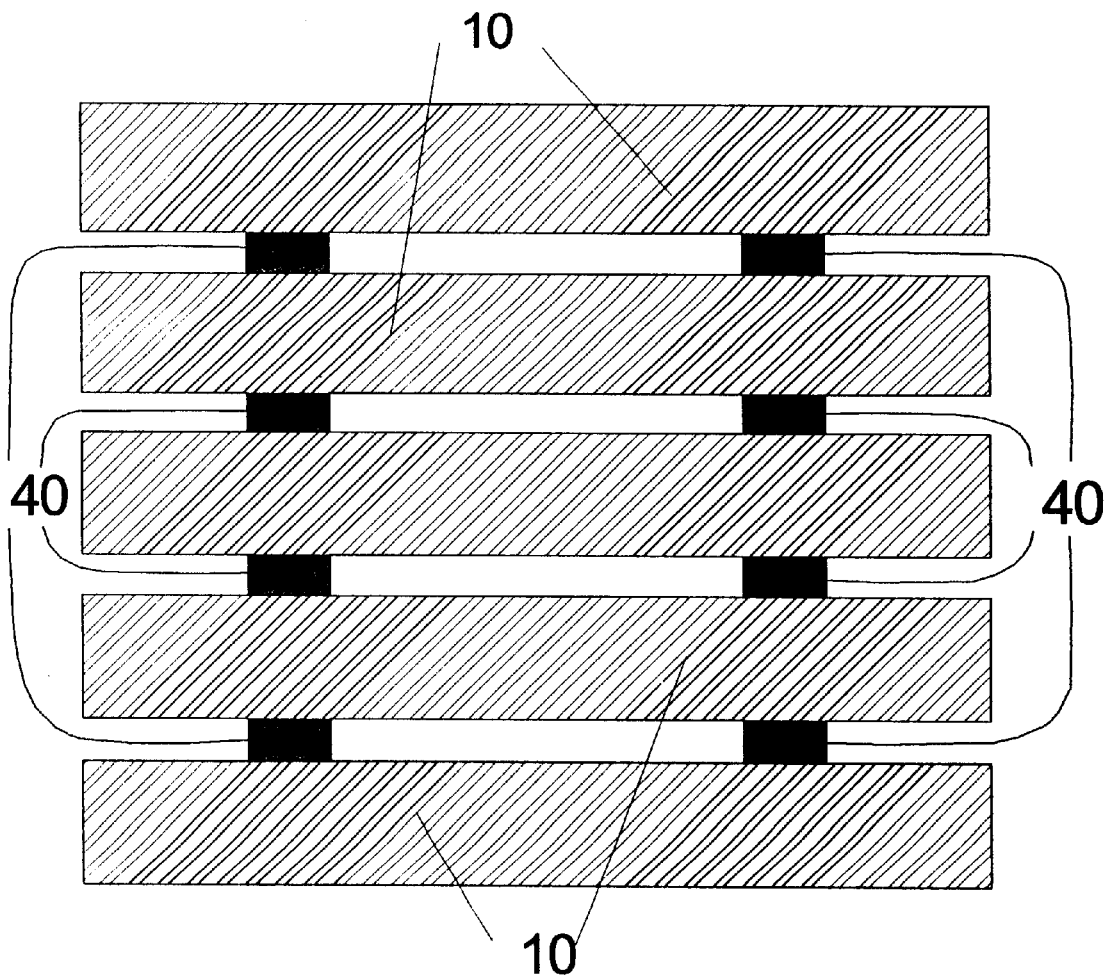
FIG. 6 shows a stack arrangement of low Hysteresis loss magnetic plates with spacers. This arrangement is used in one of the methods of making new high frequency, low loss composite material in which the stack is dipped in a molten or liquid insulating material. Alternately, a molten or insulating material is poured on the stack so that a thin film of the insulating material is formed between the adjacent magnetic plates.

A yet further method of making the composite, high frequency magnetic material of the present invention is illustrated in FIG. 6, which shows a stack of magnetic plates 10 with spacers 40 during a process of making the composite high frequency material. The stack is dipped in a molten insulating material so as to form thin insulating films 20 between adjacent magnetic plates after cooling. Alternately, the molten insulating material is poured on the stack so as to fill the gaps between the adjacent magnetic plates 10. This method is suitable when the insulating material is glass (silicon dioxide) or an organic material. Preferably, the insulating material has a low melting temperature.

While the preferred embodiments of the present invention have been shown and described herein, it will be obvious that such embodiments are provided by way of example only. Numerous variations, changes and substitutions will occur to those skilled in the art without departing from the scope of invention herein. Accordingly, it is intended that the invention be limited only by the spirit and scope of the appended claims:

What is claimed is:

1. A composite, high frequency magnetic material for operating at frequencies above 1 MHz, comprising:
   a multilayer structure comprising alternating magnetic plates and insulating films having high resistivity, the magnetic plates being made of very low hysteresis loss material and having a thickness such that the eddy current loss from the induced currents flowing within the magnetic plate is not significant, the insulating film being made of an electrically insulating material.

2. The composite, high frequency magnetic material of claim 1, wherein the ferromagnetic and ferrimagnetic materials are ferrites.

3. The composite, high frequency magnetic material of claim 2, wherein the ferrite is MnZn ferrite.

4. The composite, high frequency magnetic material of claim 2, wherein the ferrite is NiZn ferrite.

5. The composite, high frequency magnetic material of claim 1, wherein the insulating material is a ceramic.

6. The composite, high frequency magnetic material of claim 1, wherein the insulating film is a material selected from a group consisting of silicon dioxide, magnesium oxide, calcium oxide, aluminum oxide, polymeric insulating films, aluminum nitride and beryllium oxide.

7. The composite, high frequency magnetic material of claim 1, wherein the insulating material is a low melting temperature glass.

8. The composite, high frequency magnetic material of claim 1, wherein the insulating film is a polymer.

9. The composite, high frequency magnetic material of claim 8, wherein the polymer is a polyamide.

10. The composite, high frequency magnetic material of claim 1, wherein the thin film has an adhesive coated on both sides.

11. The composite, high frequency magnetic material of claim 10, wherein the adhesive is a TEFLON resin.

12. The composite, high frequency magnetic material of claim 1, wherein the insulating film has a thickness greater than 10 microns.

13. The composite, high frequency magnetic material of claim 1, wherein the insulating film is substantially free of pin-holes and other defects.

14. The composite, high frequency magnetic material of claim 1, wherein the low hysteresis loss material has hysteresis loss substantially less than $10^{-8}$ Joules/cycle/cc@ 300 G.

15. The composite, high frequency magnetic material of claim 1, wherein the electrically insulating material has a dielectric strength substantially higher than 1 kV/cm.

16. The composite, high frequency magnetic material of claim 1, wherein the composite, high frequency magnetic material has a resistivity substantially higher than $10^{10}$ ohm-m in 1–10 MHz range.

17. The composite, high frequency magnetic material of claim 1, wherein the magnetic plates and insulating films are substantially curved.

18. The composite, high frequency magnetic material of claim 1, wherein the magnetic plates have a substantially pie-shaped cross-section.

* * * * *